United States Patent [19]

Bjornson et al.

[11] Patent Number: 5,291,681
[45] Date of Patent: Mar. 8, 1994

[54] MEANS FOR HANDLING A LONG LINE ON A FISHING VESSEL

[76] Inventors: Aegir Bjornson, Vallgatan 17, Smogen S-450 43; Hans-Oskar Hasslof, Fotbollsvagen 6, Kungshamn S-456 00, both of Sweden

[21] Appl. No.: 910,277

[22] PCT Filed: Nov. 22, 1991

[86] PCT No.: PCT/SE91/00794
§ 371 Date: Aug. 4, 1992
§ 102(e) Date: Aug. 4, 1992

[87] PCT Pub. No.: WO92/09194
PCT Pub. Date: Jun. 11, 1992

[30] Foreign Application Priority Data

Nov. 22, 1990 [SE] Sweden ................... 9003711-0

[51] Int. Cl.⁵ .................. A01K 91/00; A01K 79/00
[52] U.S. Cl. ........................... 43/8; 43/4; 43/27.4; 242/224; 242/85.1
[58] Field of Search ............. 43/8, 6.5, 20, 4, 4.5, 43/26.1, 27.4, 25; 242/224, 85.1

[56] References Cited

U.S. PATENT DOCUMENTS

| | | | |
|---|---|---|---|
| 3,945,144 | 3/1976 | Purselley | 43/27.4 |
| 4,250,648 | 2/1981 | Jacobsen | 43/4 |
| 4,266,359 | 5/1981 | Alex | 43/27.4 |
| 4,359,835 | 11/1982 | Christiansen | 43/6.5 |
| 4,567,684 | 2/1986 | Bjorshol | 43/27.4 |
| 4,631,850 | 12/1986 | Chureau | 43/27.4 |

Primary Examiner—Paula A. Bradley
Assistant Examiner—Chuck Y. Mah
Attorney, Agent, or Firm—Lerner, David, Littenberg, Krumholz & Mentlik

[57] ABSTRACT

Apparatus for handing monofilament fishing line including a plurality of branch lines with associated hooks is disclosed including an elongated substantially cylindrical body mounted on the bow of the vessel so that a plurality of loops of the monofilament fishing line can be formed thereon, a substantially U-shaped yoke mounted on the stern of the vessel whereby the plurality of loops of the monofilament fishing line can be drawn therefrom, and including braking means associated with the U-shaped yoke for applying pressure to the plurality of loops and ensuring that they are drawn individually from the substantially U-shaped yoke.

9 Claims, 2 Drawing Sheets

MEANS FOR HANDLING A LONG LINE ON A FISHING VESSEL

FIELD OF THE INVENTION

The present invention relates to means for handling monofilament fishing line, including branch lines, during laying out and drawing in of long line on a fishing vessel, which long line is stored with the hooks in a magazine before laying out and after drawing in.

BACKGROUND OF THE INVENTION

Long lines used in commercial fishing may have a length of several thousand meters. Handling of these long lines during baiting, laying out and drawing in has therefore traditionally been very labor-intensive. Accordingly, equipment has been under development for many years to mechanize this task.

Most of the systems for handling such long lines are directed to the problem of preventing the hooks and branch lines from becoming entwined. The main line is normally allowed to hang freely beneath the hook magazine. This arrangement is satisfactory if the main line is of a woven type. If, however, the main line is a single fiber line, i.e., monofilament, the traditional handling of these long lines is adversely affected to a considerable extent, particularly when the fishing vessel is subjected to heavy swells. This is because a monofilament line with a diameter of, for example, 2 mm, is relatively stiff and acts like a thin spiral spring which is pulled apart coil by coil during the laying out of the long line.

It has been shown, however, that the use of monofilament line is advantageous for fishing, particularly since this type of line does not absorb impurities and microorganisms. This, in turn, results in line not "smelling" in the water, and it is therefore more effective for fishing.

It is therefore an object of the present invention to provide means on a fishing vessel which allows simpler and safer handling of the monofilament line.

SUMMARY OF THE INVENTION

According to the present invention, these and other objects have now been realized by the discovery of apparatus for drawing in a monofilament fishing line including a plurality of branch lines with associated hooks to a first location on a fishing vessel and for laying out the monofilament fishing line from a second location on the fishing vessel, the apparatus comprising first monofilament fishing line carrier means mounted at the first location comprising an elongated substantially cylindrical body whereby a plurality of loops of the monofilament fishing line can be formed thereon, and second monofilament fishing line carrier means mounted at the second location comprising a substantially U-shaped yoke member whereby the plurality of loops of the monofilament fishing line can be removed therefrom, and braking means associated with the U-shaped yoking member for applying pressure to the plurality of loops and ensuring that the plurality of loops are removed individually from the substantially U-shaped yoke member. Preferably, the first location is the bow of the fishing vessel and the second location is the stern of the fishing vessel.

In a preferred embodiment, the apparatus includes first holding means mounted on the bow and second holding means mounted on the stern, the first monofilament fishing line carrier means being mounted on the first holding means and the second monofilament fishing line carrier means being mounted on the second holding means.

In accordance with a preferred embodiment of the apparatus of the present invention, the apparatus includes magazine means for holding the plurality of hooks associated with the plurality of branch lines upon the drawing in of the monofilament fishing line, the first magazine means being mounted on the first holding means, and second magazine means for holding the plurality of hooks associated with the plurality of branch lines upon feeding out of the monofilament fishing line, the second magazine means being mounted on the second holding means.

In a preferred embodiment, the first monofilament fishing line carrier means is mounted below the first magazine means on the first holding means, and the second monofilament fishing line carrier means is mounted below the second magazine means on the second holding means.

In accordance with another embodiment of the apparatus of the present invention, the braking means comprises an elongated member displaceable in a vertical plane whereby the elongated member may be influenced by the force of gravity to press down upon the plurality of loops. Preferably, the elongated member is pivotably mounted on the second holding means.

In accordance with another embodiment of the apparatus of the present invention, the elongated substantially cylindrical body includes at least one groove extending axially along its surface whereby an arm may be inserted within the plurality of loops for gathering and binding of the plurality of loops and transferring same to the second monofilament fishing line carrier means.

In accordance with another embodiment of the apparatus of the present invention, the elongated substantially cylindrical body includes a conically shaped end portion for assisting in the application of the plurality of loops thereon.

The objects of the present invention are achieved by the means according to the present invention which is characterized in that the bow and the stern of the fishing vessel are each provided with at least one holding fixture for one end of a magazine and an oblong carrier for a coiled main line is shaped with extensions in the vertical and horizontal plane and which acts in cooperation with the holding fixture. Because of the arrangement of the oblong carriers at the bow and stern of the fishing vessel, an inexpensive aid for controlled winding up and unwinding of monofilament line is thus obtained.

BRIEF DESCRIPTION OF THE DRAWINGS

A more complete understanding of the nature and substance of the present invention can be gleaned from the following detailed description, which refers to the attached drawings in which.

DETAILED DESCRIPTION

Figure 1:
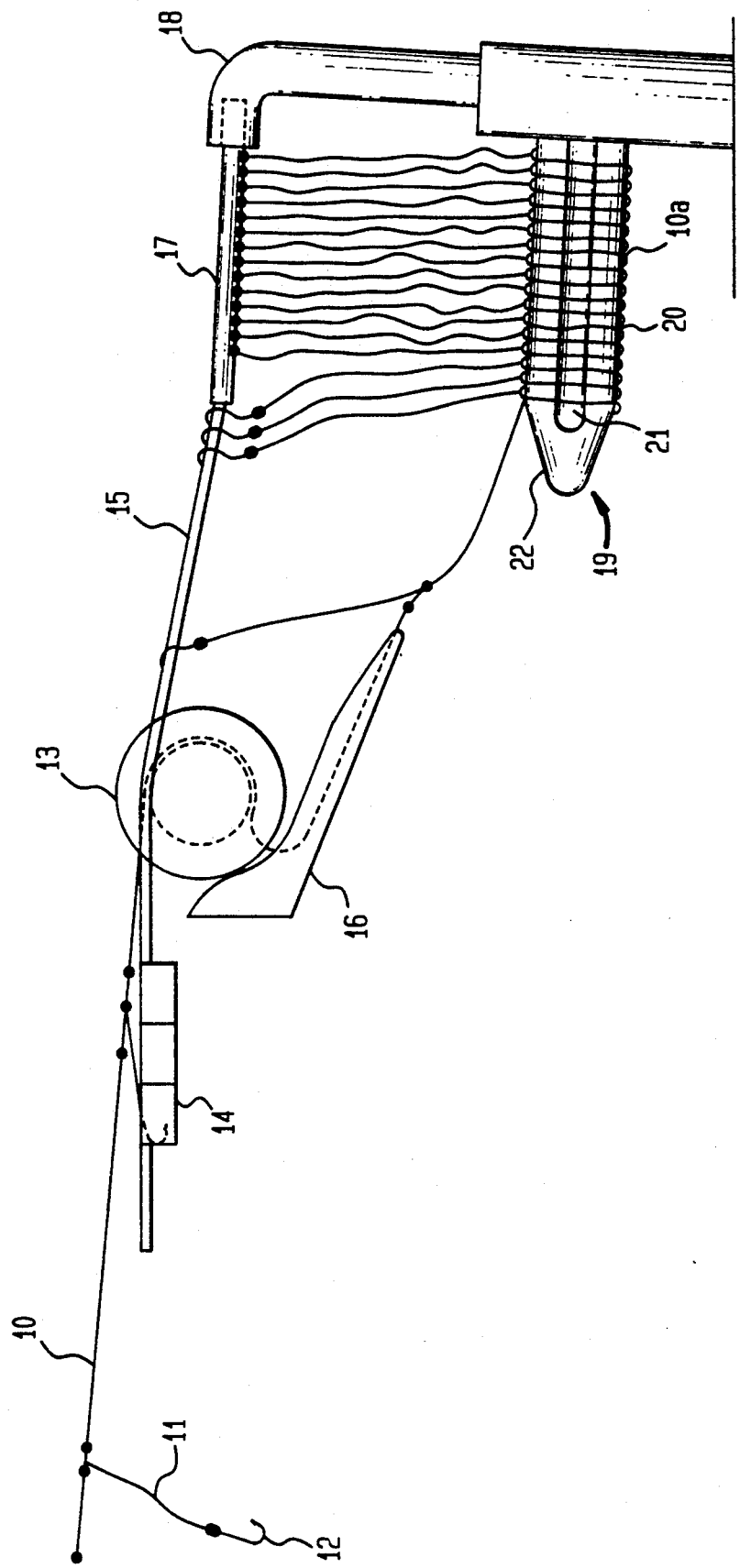
FIG. 1 is a side, elevational, partially schematic view of the carrier at the bow of a fishing vessel showing the arrangement for drawing in the long line.

Referring first to the drawings, in which like numerals refer to like portions thereof, FIG. 1 shows a long line with a main line 10, branch lines 11, and hooks 12. The long line can have a total length of about 30 kilometers, though in the present case it is divided into sections of around 500 meters in length.

The long line is taken up at the bow of the fishing vessel by means of the schematically illustrated arrangement shown in FIG. 1 comprising a winch-drum 13, a collector device 14 with a guide rail 15 for the hooks 12, and a stripper 16 for the main line 10 from the winch-drum 13. The hooks 12 are manually displaced from the guide rail 15 into a magazine 17 in the form of a hollow profile, which is connected to the guide rail 15, and which maintains the hooks in spaced relationship in series. The magazine 17 is placed in a holding fixture 18, which is mounted on a support.

The support also carries a carrier 19 which comprises a substantially cylindrical oblong body 20 onto which the main line is simultaneously manually wound while the hooks 12 are fed into the magazine 17. The oblong body 20 is provided with a groove 21 running along its surface which allows an arm to be inserted therein, so that a strap or the like can be fastened around the main line coil 10a of the long line section. The oblong body 20 is further provided with a conically-shaped endpiece 22 which facilitates the coiling of the main line.

The long line section bound by a strap, together with its associated magazine 17, can now be transferred to the stern of the fishing vessel, from where it can later be laid out.

Figure 2:
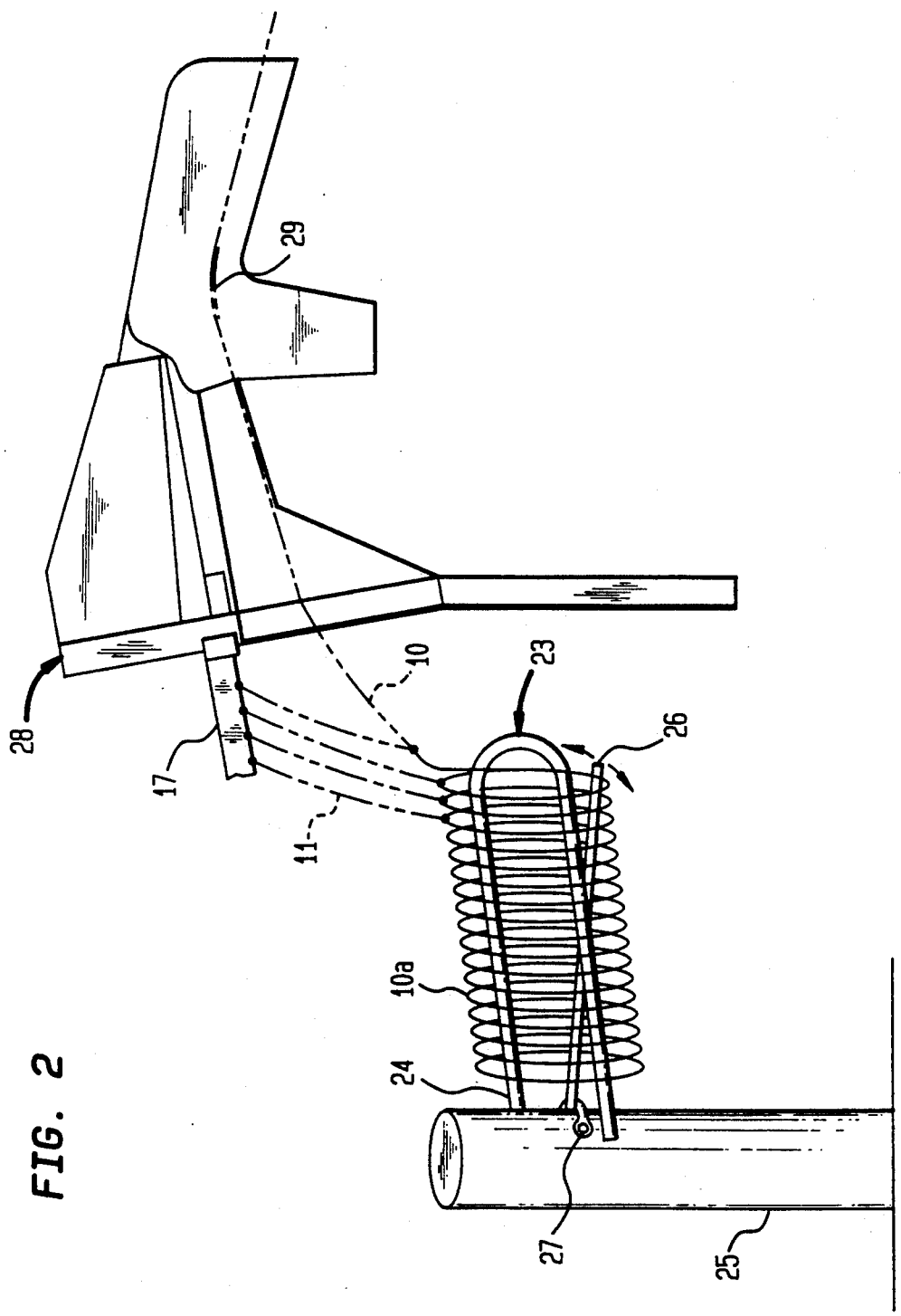
FIG. 2 is a side, elevational, partially schematic view of the carrier at the stern of the fishing vessel showing the arrangement for laying out of the long line.

Turning to FIG. 2, there is therein a carrier 23 arranged at the bow of the fishing vessel, which consists of an extended U-shaped yoke 24 which is fixedly attached to a support 25, and a rod 26, which is movable within the yoke 24. The rod 26 is pivotably attached to the support 25 at a pivot point 27. When the long line coil 10a is to be inserted on the carrier 23, the rod 26 is lifted so that it will end up in the center of the coil. It is then easy to slip on the coil, whereafter the rod 26 can be released to press down the end of the coil 10a remote from the support 25. The retaining strap can then be removed, and the long 30 line section's forward end can be connected to the rear end of the previous long line section. Meanwhile, the magazine 17 has been placed in a holding fixture 28 which includes a device for automatic baiting and feeding out of the long line.

During the feeding out process, the movable rod 26 ensures that only one loop at a time can be drawn or removed from the carrier 23. In order for the feeding out from the carrier to take place smoothly, and with just sufficient braking of the line with each removal of the separate loops, the line should be drawn from the carrier at a certain average angle with respect to the carrier's direction of length. This angle is dependent on several factors, such as the length of the branch lines and the type of laying out apparatus 29, though it should be in the order of between about 15° and 30°.

The invention is not restricted to the above-described embodiment, and several variants are conceivable within the scope of the appended claims. For example, the carrier 23 may be provided with an inner movable yoke and a central rod 26.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for drawing in a monofilament fishing line including a plurality of branch lines with associated hooks to a first location on a fishing vessel and for laying out said monofilament fishing line from a second location on said fishing vessel, said apparatus comprising first monofilament fishing line carrier means mounted at said first location comprising an elongated substantially cylindrical body whereby a plurality of loops of said monofilament fishing line can be formed thereon, and second monofilament fishing line carrier means mounted at said second location comprising a substantially U-shaped yoke member whereby said plurality of loops of said monofilament fishing line can be removed therefrom, and braking means associated with said U-shaped yoke member for applying pressure to said plurality of loops and ensuring that said plurality of loops are removed individually from said substantially U-shaped yoke member.

2. The apparatus of claim 1 wherein said first loation comprises the bow of said fishing vessel and said second location comprises the stern of said fishing vessel.

3. The apparatus of claim 2 including first holding means mounted on said bow, and second holding means mounted on said stern, said first monofilament fishing line carrier means being mounted on said first holding means and said second monofilament fishing line carrier means being mounted on said second holding means.

4. The apparatus of claim 6 including first magazine means for holding said plurality of hooks associated with said plurality of branch lines upon the drawing in of said monofilament fishing line, said first magazine means being mounted on said first holding means, and second magazine means for holding said plurality of hooks associated with said plurality of branch lines upon feeding out of said monofilament fishing line, said second magazine means being mounted on said second holding means.

5. The apparatus of claim 4 wherein said first monofilament fishing line carrier means is mounted below said first magazine means on said first holding means, and said second monofilament fishing line carrier means is mounted below said second magazine means on said second holding means.

6. The apparatus of claim 1 wherein said braking means comprises an elongated member displaceable in a vertical plane whereby said elongated member can be influenced by the force of gravity to press down upon said plurality of loops.

7. The apparatus of claim 6 wherein said elongated member is pivotally mounted to said second holding means.

8. The apparatus of claim 1 wherein said elongated susbstantially cylindrical body includes at least one groove extending axially along the surface thereof, whereby an arm can be inserted within said plurality of loops for gathering and binding of said plurality of loops and transferring same to said second monofilament fishing line carrier means.

9. The apparatus of claim 1 wherein said elongated substantially cylindrical body includes a conically shaped end portion for assisting in the application of said plurality of loops thereon.

* * * * *

UNITED STATES PATENT AND TRADEMARK OFFICE
CERTIFICATE OF CORRECTION

PATENT NO. : 5,291,681
DATED : March 8, 1994
INVENTOR(S) : Bjornson et al.

It is certified that error appears in the above-indentified patent and that said Letters Patent is hereby corrected as shown below:

Column 3, line 39, delete "30".

Signed and Sealed this

Twelfth Day of July, 1994

Attest:

BRUCE LEHMAN

Attesting Officer　　　　Commissioner of Patents and Trademarks